United States Patent
Yang et al.

(10) Patent No.: US 11,258,801 B2
(45) Date of Patent: Feb. 22, 2022

(54) METHOD OF PERFORMING SMART HYBRID ACCELERATION ON RESOURCES, DEVICE, MEDIUM AND APPARATUS

(71) Applicant: GUIZHOU BAISHANCLOUD TECHNOLOGY CO., LTD., Guiyang (CN)

(72) Inventors: Yang Yang, Beijing (CN); Hui Miao, Beijing (CN)

(73) Assignee: GUIZHOU BAISHANCLOUD TECHNOLOGY CO., LTD., Guiyang (CN)

( * ) Notice: Subject to any disclaimer, the term of this patent is extended or adjusted under 35 U.S.C. 154(b) by 243 days.

(21) Appl. No.: 16/485,924

(22) PCT Filed: Feb. 5, 2018

(86) PCT No.: PCT/CN2018/075232
§ 371 (c)(1),
(2) Date: Aug. 14, 2019

(87) PCT Pub. No.: WO2018/149317
PCT Pub. Date: Aug. 23, 2018

(65) Prior Publication Data
US 2020/0045054 A1 Feb. 6, 2020

(30) Foreign Application Priority Data
Feb. 15, 2017 (CN) .......................... 201710081627.8

(51) Int. Cl.
*H04L 29/06* (2006.01)
*H04L 12/24* (2006.01)
(Continued)

(52) U.S. Cl.
CPC ............ *H04L 63/105* (2013.01); *H04L 41/20* (2013.01); *H04L 41/24* (2013.01);
(Continued)

(58) Field of Classification Search
CPC ............... H04L 63/105; H04L 63/0428; H04L 63/0485; H04L 63/166; H04L 41/20; H04L 41/24; H04L 61/3025; H04L 67/02
(Continued)

(56) References Cited

U.S. PATENT DOCUMENTS

2002/0108059 A1  8/2002  Canion et al.
2003/0097481 A1  5/2003  Richter
(Continued)

FOREIGN PATENT DOCUMENTS

CN  1640093 A      7/2005
CN  101557342 A   10/2009
(Continued)

OTHER PUBLICATIONS

The World Intellectual Property Organization (WIPO) International Search Report for PCT/CN2018/075232 dated May 9, 2018 5 Pages.

*Primary Examiner* — James E Springer
(74) *Attorney, Agent, or Firm* — Anova Law Group, PLLC

(57) ABSTRACT

A smart hybrid acceleration method includes receiving a handshake request from a client terminal, and determining whether the handshake request contains a self-defined resource extension field. If not, a target domain name with which the client terminal is to connect is acquired from the handshake request, and whether to use a hardware acceleration or a software acceleration is determined according to a level of the target domain name. If so, a resource level of a resource accessed by the client terminal is determined according to content in the self-defined resource extension field, and whether to use the hardware acceleration or the software acceleration is determined according to the resource level.

18 Claims, 2 Drawing Sheets

(51) Int. Cl.
*H04L 29/12* (2006.01)
*H04L 29/08* (2006.01)
*H04L 41/00* (2022.01)
*H04L 61/3015* (2022.01)
*H04L 67/02* (2022.01)

(52) U.S. Cl.
CPC ...... *H04L 61/3025* (2013.01); *H04L 63/0428* (2013.01); *H04L 63/0485* (2013.01); *H04L 63/166* (2013.01); *H04L 67/02* (2013.01)

(58) Field of Classification Search
USPC .......................................................... 726/3
See application file for complete search history.

(56) References Cited

U.S. PATENT DOCUMENTS

| | | | |
|---|---|---|---|
| 2008/0098215 A1* | 4/2008 | Belgaied | H04L 9/00 713/160 |
| 2009/0327412 A1 | 12/2009 | Lepeska | |
| 2017/0116004 A1* | 4/2017 | Devegowda | G06F 9/5033 |
| 2017/0134041 A1* | 5/2017 | Haverkamp | G06F 16/1744 |

FOREIGN PATENT DOCUMENTS

| | | |
|---|---|---|
| CN | 102377754 A | 3/2012 |
| CN | 105430046 A | 3/2016 |

* cited by examiner

METHOD OF PERFORMING SMART HYBRID ACCELERATION ON RESOURCES, DEVICE, MEDIUM AND APPARATUS

CROSS-REFERENCE TO RELATED APPLICATIONS

The present application is a national stage entry under 35 U.S.C. § 371 of International Application No. PCT/CN2018/075232, filed on Feb. 5, 2018, which claims priority to Chinese Patent Application No. 201710081627.8 filed to the China National Intellectual Property Administration on Feb. 15, 2017 and entitled "METHOD AND DEVICE FOR PERFORMING SMART HYBRID ACCELERATION ON RESOURCES HAVING DIFFERENT SECURITY LEVELS", the entire contents of both of which are hereby incorporated by reference.

TECHNICAL FIELD OF THE PRESENT INVENTION

Embodiments of the present invention relate to but not limited to the communication field, and in particular to a method, device, medium and apparatus for performing smart hybrid acceleration on resources.

BACKGROUND OF THE PRESENT INVENTION

One of the challenges brought to the Content Delivery Network (CDN for short) by the security-oriented HTTP channel (Hyper Text Transfer Protocol over Secure Socket Layer, HTTPS) is how to cope with a huge increase in CPU load, particularly for the load on small files. This is because the Queries Per Second (QPS for short) of the small files is higher under the same bandwidth. The cost for acceleration by a hardware scheme (e.g., an acceleration card) is very high, but the requirements for performance cannot be satisfied by a pure software scheme (e.g., by CPU computation). A CDN server provides a variety of services. Since it is required to accelerate static resources, dynamic resource and the like, the resources having different security levels cannot be processed by the same standard. However, in most existing methods, a same HTTPS scheme is used for any type of resources. Consequently, an expensive hardware acceleration scheme is still used for resources having a lower security level. Apparently, it is unable to realize high cost performance.

SUMMARY OF THE PRESENT INVENTION

The following provides a general summary of the theme described in detail herein. The general summary is not intended to limit the protection scope of the appended claims.

In order to solve the above technical problem, the embodiments of the present invention provide a method, device, medium and apparatus for performing smart hybrid acceleration on resources.

An embodiment of the present invention provides a method for performing smart hybrid acceleration on resources, comprising steps of:

receiving a handshake request from a client terminal; determining whether the handshake request contains a self-defined resource extension field; if the handshake request does not contain any self-defined resource extension field, acquiring a target domain name to be connected by the client terminal in the handshake request, and determining, according to a level of the target domain name, whether acceleration processing is performed by a hardware acceleration method or a software acceleration method; and, if the handshake request contains a self-defined resource extension field, determining, according to content in the self-defined resource extension field, a resource level of a resource accessed by the client terminal, and determining, according to the resource level, whether acceleration processing is performed by a hardware acceleration method or a software acceleration method.

The method for performing smart hybrid acceleration on resources is further featured by:

the step of determining whether the handshake request contains a self-defined resource extension field comprises: determining whether a client hello message of the handshake request contains the self-defined resource extension field.

The method for performing smart hybrid acceleration on resources is further featured by:

the step of determining, according to a level of the target domain name, whether acceleration processing is performed by a hardware acceleration method or a software acceleration method comprises: performing acceleration processing by a hardware acceleration method when it is determined that the level of the target domain name is a high security level, and performing acceleration processing by a software acceleration method when it is determined that the level of the target domain name is a low security level; and the step of determining, according to content in the self-defined resource extension field, a resource level of a resource accessed by the client terminal and determining, according to the resource level, whether acceleration processing is performed by a hardware acceleration method or a software acceleration method comprises:

in a case where the content in the self-defined resource extension field is a resource level of a resource accessed by the client terminal, performing acceleration processing by a hardware acceleration method when the resource level is a high security level, and performing acceleration processing by a software acceleration method when the resource level is a low security level;

or, in a case where the content in the self-defined resource extension field is a resource type of a resource accessed by the client terminal, performing acceleration processing by a hardware acceleration method when it is determined according to the resource type that the corresponding resource level is a high security level, and performing acceleration processing by a software acceleration method when it is determined according to the resource type that the corresponding resource level is a low security level, wherein the resource type includes a static resource type or a dynamic resource type.

An embodiment of the present invention provides a method for performing smart hybrid acceleration on resources, comprising steps of:

receiving a handshake request from a client terminal, acquiring, from the handshake request, a target domain name to be connected by the client terminal in the handshake request, and determining, according to a level of the target domain name, whether acceleration processing is performed by a hardware acceleration method or a software acceleration method;

or, receiving a handshake request from a client terminal, acquiring, from the handshake request, content in a self-defined resource extension field, determining, according to the content, a resource level of a resource accessed by the client terminal, and determining, according to the resource level, whether acceleration processing is performed by a hardware acceleration method or a software acceleration method.

The method for performing smart hybrid acceleration on resources is further featured by:

the step of determining, according to a level of the target domain name, whether acceleration processing is performed by a hardware acceleration method or a software acceleration method comprises:

performing acceleration processing by a hardware acceleration method when it is determined that the level of the target domain name is a high security level, and performing acceleration processing by a software acceleration method when it is determined that the level of the target domain name is a low security level; and the step of determining, according to the content in the self-defined resource extension field, a resource level of a resource accessed by the client terminal and determining, according to the resource level, whether acceleration processing is performed by a hardware acceleration method or a software acceleration method comprises:

in a case where the content in the self-defined resource extension field is a resource level of a resource accessed by the client terminal, performing acceleration processing by a hardware acceleration method when the resource level is a high security level, and performing acceleration processing by a software acceleration method when the resource level is a low security level;

or, in a case where the content in the self-defined resource extension field is a resource type of a resource accessed by the client terminal, performing acceleration processing by a hardware acceleration method when it is determined according to the resource type that the corresponding resource level is a high security level, and performing acceleration processing by a software acceleration method when it is determined according to the resource type that the corresponding resource level is a low security level.

An embodiment of the present invention provides a device for performing smart hybrid acceleration on resources having different security levels, comprising:

a receiving module, configured to receive a handshake request from a client terminal;

a determination module, configured to determine whether the handshake request contains a self-defined resource extension field;

a first processing module, configured to: when the determination module determines that the handshake request does not contain any self-defined resource extension field, acquire a target domain name to be connected by the client terminal in the handshake request and determine, according to a level of the target domain name, whether acceleration processing is performed by a hardware acceleration method or a software acceleration method; and a second processing method, configured to: when the determination module determines that the handshake request contains a self-defined resource extension field, determine, according to content in the self-defined resource extension field, a resource level of a resource accessed by the client terminal and determine, according to the resource level, whether acceleration processing is performed by a hardware acceleration method or a software acceleration method;

wherein the receiving module and the determination module are positioned in a front-end apparatus, and the first processing module and the second processing module are positioned in a Content Delivery Network server or a non-CDN server; or, the receiving module, the determination module, the first processing module and the second processing module are all positioned in a CDN server or a non-CDN server.

The device for performing smart hybrid acceleration on resources is further featured by:

the determination module is further configured to determine, according to the determination whether a client hello message of the handshake request contains a self-defined resource extension field, whether the handshake request contains a self-defined resource extension field.

The device for performing smart hybrid acceleration on resources is further featured by:

the first processing module is further configured to perform acceleration processing by a hardware acceleration method when it is determined that the level of the target domain name is a high security level, and perform acceleration processing by a software acceleration method when it is determined that the level of the target domain name is a low security level; and the second processing module is further configured to: when the content in the self-defined resource extension field is a resource level of a resource accessed by the client terminal, perform acceleration processing by a hardware acceleration method after it is determined that the resource level is a high security level, and perform acceleration processing by a software acceleration method after it is determined that the resource level is a low security level; and, when the content in the self-defined resource extension field is a resource type of a resource accessed by the client terminal, perform acceleration processing by a hardware acceleration method after it is determined according to the resource type that the corresponding resource level is a high security level, and perform acceleration processing by a software acceleration method after it is determined according to the resource type that the corresponding resource level is a low security level.

An embodiment of the present invention provides a device for performing smart hybrid acceleration on resources having different security levels, applied to a Content Delivery Network server or a non-CDN server, comprising:

a receiving module, configured to receive a handshake request from a client terminal; and a processing module, configured to: acquire, from the handshake request, a target domain name to be connected by the client terminal in the handshake request, and determine, according to a level of the target domain name, whether acceleration processing is performed by a hardware acceleration method or a software acceleration method; or, acquire, from the handshake request, content in a self-defined resource extension field, determine, according to the content, a resource level of a resource accessed by the client terminal, and determine, according to the resource level, whether acceleration processing is performed by a hardware acceleration method or a software acceleration method.

The device for performing smart hybrid acceleration on resources is further featured by:

the processing module is configured to: perform acceleration processing by a hardware acceleration method when it is determined that the level of the target domain name is a high security level, and perform acceleration processing by a software acceleration method when it is determined that the level of the target domain name is a low security level; the processing module is further configured to: when the content in the self-defined resource extension field is a resource level of a resource accessed by the client terminal, perform acceleration processing by a hardware acceleration method after it is determined that the resource level is a high security level, and perform acceleration processing by a software acceleration method after it is determined that the resource level is a low security level; and, the processing module is further configured to: when the content in the self-defined resource extension field is a resource type of a resource accessed by the client terminal, perform acceleration processing by a hardware acceleration method after it is determined according to the resource type that the corresponding resource level is a high security level, and perform acceleration processing by a software acceleration method after it is determined according to the resource type that the corresponding resource level is a low security level.

An embodiment of the present invention provides a computer-readable storage medium stored with computer programs that, when executed by a processor, implement the steps of the method described above.

An embodiment of the present invention provides a computer apparatus, including a memory, a processor and computer programs that are stored on the memory and can be run on the processor, the processor implementing the steps of the method described above.

In the embodiments of the present invention, different acceleration methods are used for resources having different security levels, and the saved computation capacity of an acceleration card is applied to resources having higher security requirements, so that the cost performance and the utilization efficiency of edge nodes of a CDN are improved.

BRIEF DESCRIPTION OF THE DRAWINGS

The drawings described herein are used for providing further understanding of the embodiments of the present invention and constitute a part of the present application. Illustrative embodiments of the present invention and descriptions thereof are used for explaining the embodiments of the present invention, rather than constituting any inappropriate limitations to the embodiments of the present invention. In the drawings.

DETAILED DESCRIPTION OF THE PRESENT INVENTION

Now, the embodiments of the present invention will be further described by specific implementations with reference to the drawings.

In the embodiments of the present invention, when a server can be controlled by a client terminal, the client terminal is able to set a self-defined resource extension field in a handshake request; however, when a server is uncontrollable for a client terminal, the client terminal is unable to set a self-defined resource extension field in a handshake request.

Embodiment 1

Figure 1:
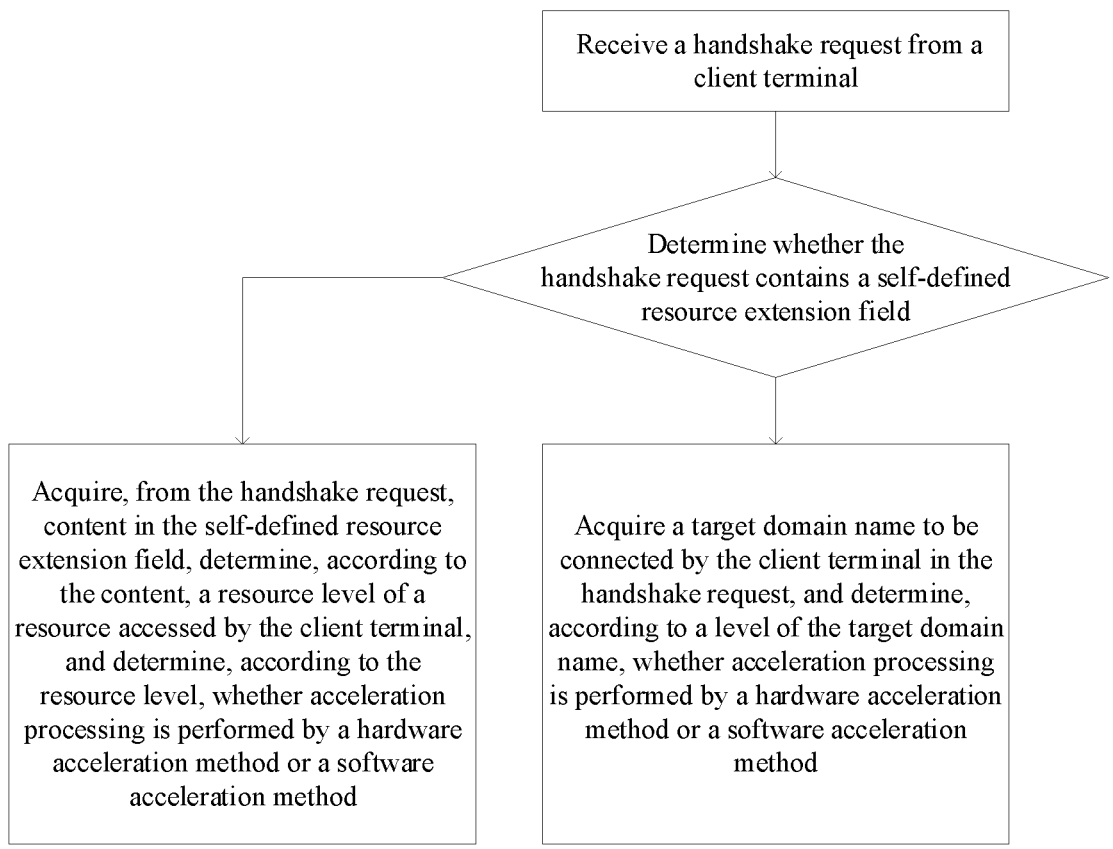
FIG. 1 is a flowchart of a method for performing smart hybrid acceleration on resources having different security levels in Embodiment 1.

FIG. 1 is a flowchart of a method for performing smart hybrid acceleration on resources having different security levels in Embodiment 1. The method comprises steps of: receiving a handshake request from a client terminal; determining whether the handshake request contains a self-defined resource extension field; if the handshake request does not contain any self-defined resource extension field, acquiring a target domain name to be connected by the client terminal in the handshake request, and determining, according to a level of the target domain name, whether acceleration processing is performed by a hardware acceleration method or a software acceleration method; and, if the handshake request contains a self-defined resource extension field, determining, according to content in the self-defined resource extension field, a resource level of a resource accessed by the client terminal, and determining, according to the resource level, whether the acceleration processing is performed by a hardware acceleration method or a software acceleration method.

Wherein:

the step of determining whether the handshake request contains a self-defined resource extension field comprises: determining whether a client hello message of the handshake request contains the self-defined resource extension field.

The step of determining, according to a level of the target domain name, whether acceleration processing is performed by a hardware acceleration method or a software acceleration method comprises: performing acceleration processing by a hardware acceleration method when it is determined that the level of the target domain name is a high security level, and performing acceleration processing by a software acceleration method when it is determined that the level of the target domain name is a low security level.

The step of determining, according to content in the self-defined resource extension field, a resource level of a resource accessed by the client terminal and determining, according to the resource level, whether acceleration processing is performed by a hardware acceleration method or a software acceleration method comprises: in a case where the content in the self-defined resource extension field is a resource level of a resource accessed by the client terminal, performing acceleration processing by a hardware acceleration method when the resource level is a high security level, and performing acceleration processing by a software acceleration method when the resource level is a low security level; or, in a case where the content in the self-defined resource extension field is a resource type of a resource accessed by the client terminal, performing acceleration processing by a hardware acceleration method when it is determined according to the resource type that the corresponding resource level is a high security level, and performing acceleration processing by a software acceleration method when it is determined according to the resource type that the corresponding resource level is a low security level. The resource type includes a static resource type or a dynamic resource type, or further includes information such as application involved and resource address. The static resource type corresponds to a low security level, and the dynamic resource type corresponds to a high security level.

In this embodiment of the present invention, the software acceleration method includes, but not limited to: a multi-prime RSA acceleration method.

Embodiment 2

Figure 2:
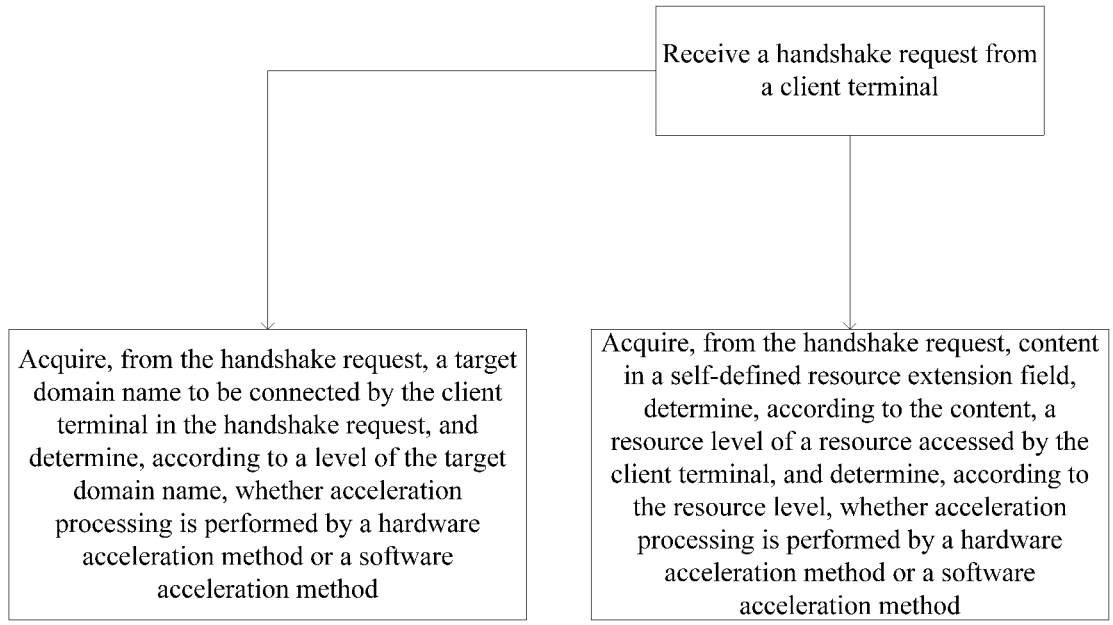
FIG. 2 is a flowchart of a method for performing smart hybrid acceleration on resources having different security levels in Embodiment 2.

FIG. 2 is a flowchart of a method for performing smart hybrid acceleration on resource having different security levels in Embodiment 2. The method comprises steps of: receiving a handshake request from a client terminal, acquiring, from the handshake request, a target domain name to be connected by the client terminal in the handshake request, and determining, according to a level of the target domain name, whether acceleration processing is performed by a hardware acceleration method or a software acceleration method; or, receiving a handshake request from a client terminal, acquiring, from the handshake request, content in a self-defined resource extension field, determining, according to the content, a resource level of a resource accessed by the client terminal, and determining, according to the resource level, whether acceleration processing is performed by a hardware acceleration method or a software acceleration method.

Wherein:

the step of determining, according to a level of the target domain name, whether acceleration processing is performed by a hardware acceleration method or a software acceleration method comprises: performing acceleration processing by a hardware acceleration method when it is determined that the level of the target domain name is a high security level, and performing acceleration processing by a software acceleration method when it is determined that the level of the target domain name is a low security level.

The step of determining, according to the content in the self-defined resource extension field, a resource level of a resource accessed by the client terminal and determining, according to the resource level, whether acceleration processing is performed by a hardware acceleration method or a software acceleration method comprises: in a case where the content in the self-defined resource extension field is a resource level of a resource accessed by the client terminal, performing acceleration processing by a hardware acceleration method when the resource level is a high security level, and performing acceleration processing by a software acceleration method when the resource level is a low security level; or, in a case where the content in the self-defined resource extension field is a resource type of a resource accessed by the client terminal, performing acceleration processing by a hardware acceleration method when it is determined according to the resource type that the corresponding resource level is a high security level, and performing acceleration processing by a software acceleration method when it is determined according to the resource type that the corresponding resource level is a low security level.

Embodiment 3

Figure 3:
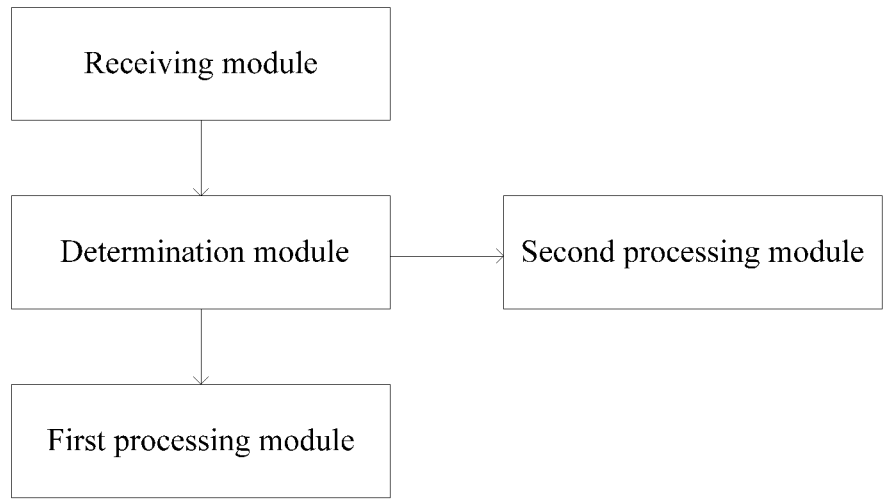
FIG. 3 is a structural diagram of a device for performing smart hybrid acceleration on resources having different security levels in Embodiment 3.

Corresponding to the method in Embodiment 1, as shown in FIG. 3, a device for performing smart hybrid acceleration on resources having different security levels comprises:

a receiving module, configured to receive a handshake request from a client terminal;

a determination module, configured to determine whether the handshake request contains a self-defined resource extension field;

a first processing module, configured to: when the determination module determines that the handshake request does not contain any self-defined resource extension field, acquire a target domain name to be connected by the client terminal in the handshake request and determine, according to a level of the target domain name, whether acceleration processing is performed by a hardware acceleration method or a software acceleration method; and a second processing method, configured to: when the determination module determines that the handshake request contains a self-defined resource extension field, determine, according to content in the self-defined resource extension field, a resource level of a resource accessed by the client terminal and determine, according to the resource level, whether acceleration processing is performed by a hardware acceleration method or a software acceleration method.

The receiving module and the determination module are positioned in a front-end apparatus, and the first processing module and the second processing module are position in a Content Delivery Network (CDN) server or a non-CDN server; or, the receiving module, the determination module, the first processing module and the second processing module are all positioned in a CDN server or a non-CDN server.

The determination module is further configured to determine, according to the determination whether a client hello message of the handshake request contains a self-defined resource extension field, whether the handshake request contains a self-defined resource extension field.

The first processing module is further configured to perform acceleration processing by a hardware acceleration method when it is determined that the level of the target domain name is a high security level, and perform acceleration processing by a software acceleration method when it is determined that the level of the target domain name is a low security level.

The second processing module is further configured to: when the content in the self-defined resource extension field is a resource level of a resource accessed by the client terminal, perform acceleration processing by a hardware acceleration method after it is determined that the resource level is a high security level, and perform acceleration processing by a software acceleration method after it is determined that the resource level is a low security level; and, when the content in the self-defined resource extension field is a resource type of a resource accessed by the client terminal, perform acceleration processing by a hardware acceleration method after it is determined according to the resource type that the corresponding resource level is a high security level, and perform acceleration processing by a software acceleration method after it is determined according to the resource type that the corresponding resource level is a low security level.

Embodiment 4

Figure 4:
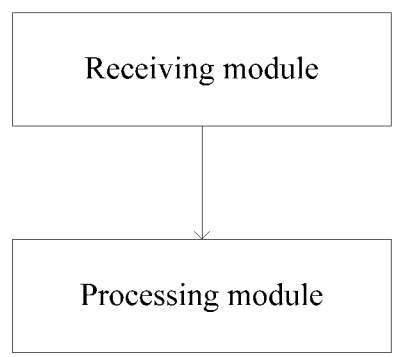
FIG. 4 is a structure diagram of a device for performing smart hybrid acceleration on resources having different security levels in Embodiment 4.

Corresponding the method in Embodiment 2, as shown in FIG. 4, a device for performing smart hybrid acceleration on resources having different security levels comprises:

a receiving module, configured to receive a handshake request from a client terminal; and a processing module, configured to: acquire, from the handshake request, a target domain name to be connected by the client terminal in the handshake request, and determine, according to a level of the target domain name, whether acceleration processing is performed by a hardware acceleration method or a software acceleration method; or, acquire, from the handshake request, content in a self-defined resource extension field, determine, according to the content, a resource level of a resource accessed by the client terminal, and determine, according to the resource level, whether acceleration processing is performed by a hardware acceleration method or a software acceleration method.

The processing module is configured to: perform acceleration processing by a hardware acceleration method when it is determined that the level of the target domain name is a high security level, and perform acceleration processing by a software acceleration method when it is determined that the level of the target domain name is a low security level; the processing module is further configured to: when the content in the self-defined resource extension field is a resource level of a resource accessed by the client terminal, perform acceleration processing by a hardware acceleration method after it is determined that the resource level is a high security level, and perform acceleration processing by a software acceleration method after it is determined that the resource level is a low security level; and, the processing module is further configured to: when the content in the self-defined resource extension field is a resource type of a resource accessed by the client terminal, perform acceleration processing by a hardware acceleration method after it is determined according to the resource type that the corresponding resource level is a high security level, and perform acceleration processing by a software acceleration method after it is determined according to the resource type that the corresponding resource level is a low security level.

An embodiment of the present invention provides a computer-readable storage medium stored with computer programs that, when executed by a processor, implement the steps of the method described above.

An embodiment of the present invention provides a computer apparatus, including a memory, a processor and computer programs that are stored on the memory and can be run on the processor. When executing the computer programs, the processor implements the steps of the method described above.

In the embodiments of the present invention, different acceleration methods are used for resources having different security levels, and the saved computation capacity of an acceleration card is applied to resources having higher security requirements, so that the cost performance and the utilization efficiency of edge nodes of a CDN are improved.

It should be understood by a person of ordinary skill in the art that, modifications or equivalent replacements may be made to the technical solutions in the embodiments of the present invention without departing from the spirit and scope of the technical solutions in the embodiments of the present invention, and these modifications or equivalent replacements shall fall into the scope of the appended claims.

It should be understood by a person of ordinary skill in the art that, all or some of steps in the methods disclosed herein and the functional modules/units in the systems and devices disclosed herein may be implemented as software, firmware, hardware and proper combinations thereof. In the hardware implementations, the division of the functional modules/units mentioned in the foregoing descriptions does not necessarily correspond to the division of the physical components. For example, one physical component may have a plurality of functions, or one function or step may be cooperatively executed by a plurality of physical components. Some components or all components may be implemented as software executed by a processor such as a digital signal processor or a microprocessor, or hardware, or integrated circuits such as application-specific integrated circuits. The software may be distributed on a computer-readable medium. The computer-readable medium may include a computer storage medium (or a non-temporary medium) and a communication medium (or a temporary medium). As known to a person of ordinary skill in the art, the computer storage medium includes volatile and nonvolatile, removable and non-removable mediums implemented in any method or technology for storing information (such as computer-readable instructions, data structures, program modules or other data). The computer storage medium includes, but not limited to: RAM, ROM, EEPROM, a flash memory or other memory technologies, CN-ROM, a Digital Versatile Disc (DVD) or other optical disc storages, a magnetic cassette, a magnetic tape, a magnetic disc memory or other magnetic storage devices, or any other medium that may be used for storing desirable information and may be accessed by a computer. In addition, as known to a person of ordinary skill in the art, the communication medium typically includes computer-readable instructions, data structures, program modules or other data such as carriers or modulation data signals in other transmission mechanisms, and may include any information delivery medium.

INDUSTRIAL APPLICABILITY

In this disclosure, different acceleration methods are used for resources having different security levels, and the saved computation capacity of an acceleration card is applied to resources having higher security requirements, so that the cost performance and the utilization efficiency of edge nodes of a CDN are improved.

What is claimed is:

1. A smart hybrid acceleration method comprising:
receiving a handshake request from a client terminal;
determining whether the handshake request contains a self-defined resource extension field;
in response to the handshake request not containing the self-defined resource extension field:
acquiring, from the handshake request, a target domain name with which the client terminal is to connect; and
determining, according to a level of the target domain name, whether to use a hardware acceleration or a software acceleration; and
in response to the handshake request containing the self-defined resource extension field:
determining, according to content in the self-defined resource extension field, a resource level of a resource accessed by the client terminal; and
determining, according to the resource level, whether to use the hardware acceleration or the software acceleration.

2. A non-transitory computer-readable storage medium storing computer programs that, when executed by a processor, implement the method according to claim 1.

3. The method according to claim 1, wherein:
determining whether the handshake request contains the self-defined resource extension field comprises determining whether a client hello message of the handshake request contains the self-defined resource extension field.

4. A non-transitory computer-readable storage medium storing computer programs that, when executed by a processor, implement the method according to claim 3.

5. The method according to claim 1, wherein determining, according to the level of the target domain name, whether to use the hardware acceleration or the software acceleration comprises:
determining to use the hardware acceleration in response to the level of the target domain name being a high security level; and
determining to use the software acceleration in response to the level of the target domain name being a low security level.

6. The method according to claim 1, wherein determining, according to the resource level, whether to use the hardware acceleration or the software acceleration comprises:
determining to use the hardware acceleration in response to the resource level being a high security level; and determining to use the software acceleration in response to the resource level being a low security level.

7. The method according to claim 1, wherein the content in the self-defined resource extension field includes the resource level, and the resource level is used to determine whether to use the hardware acceleration or the software acceleration.

8. The method according to claim 1, wherein:
the content in the self-defined resource extension field includes a resource type of the resource accessed by the client terminal;
determining, according to the content in the self-defined resource extension field, the resource level includes determining the resource level according to the resource type; and
the resource type comprises a static resource type or a dynamic resource type.

9. A smart hybrid acceleration method comprising:
receiving a handshake request from a client terminal;
acquiring, from the handshake request, at least one of a target domain name to be connected by the client terminal or content in a self-defined resource extension field; and
determining, according to at least one of a level of the target domain name or a resource level of a resource accessed by the client terminal determined according to the content, whether to use a hardware acceleration or a software acceleration, including:
determining whether to use the hardware acceleration or the software acceleration according to the level of the target domain name, including:
determining to use the hardware acceleration in response to the level of the target domain name being a high security level; and
determining to use the software acceleration in response to the level of the target domain name being a low security level; or
determining, according to the resource level, whether to use the hardware acceleration or the software acceleration, including:
determining to use the hardware acceleration in response to the resource level being a high security level; and
determining to use the software acceleration in response to the resource level being a low security level.

10. A non-transitory computer-readable storage medium storing computer programs that, when executed by a processor, implement the method according to claim 9.

11. The method according to claim 9, wherein the content in the self-defined resource extension field includes the resource level, and the resource level is used to determine whether to use the hardware acceleration or the software acceleration.

12. The method according to claim 9, wherein:
the content in the self-defined resource extension field includes a resource type of the resource accessed by the client terminal; and
the resource level is determined according to the resource type.

13. A smart hybrid acceleration apparatus comprising:
a memory storing computer programs; and
a processor configured to execute the computer programs to:
receive a handshake request from a client terminal;
determine whether the handshake request contains a self-defined resource extension field;
in response to the handshake request not containing the self-defined resource extension field:
acquire, from the handshake request, a target domain name with which the client terminal is to connect; and
determine, according to a level of the target domain name, whether to use a hardware acceleration or a software acceleration; and
in response to the handshake request containing the self-defined resource extension field:
determine, according to content in the self-defined resource extension field, a resource level of a resource accessed by the client terminal; and
determine, according to the resource level, whether to use the hardware acceleration or the software acceleration.

14. The apparatus according to claim 13, wherein the processor is further configured to execute the computer programs to:
determine whether a client hello message of the handshake request contains the self-defined resource extension field.

15. The apparatus according to claim 13, wherein the processor is further configured to execute the computer programs to:
determine to use the hardware acceleration in response to the level of the target domain name being a high security level; and
determine to use the software acceleration in response to the level of the target domain name being a low security level.

16. The apparatus according to claim 13, wherein the processor is further configured to execute the computer programs to:
determine to use the hardware acceleration in response to the resource level being a high security level; and
determine to use the software acceleration in response to the resource level being a low security level.

17. The apparatus according to claim 13, wherein the content in the self-defined resource extension field includes the resource level, and the resource level is used to determine whether to use the hardware acceleration or the software acceleration.

18. The apparatus according to claim 13, wherein:
the content in the self-defined resource extension field includes a resource type of the resource accessed by the client terminal;
the processor is further configured to execute the computer programs to determine the resource level according to the resource type; and
the resource type comprises a static resource type or a dynamic resource type.

* * * * *